United States Patent
Kalyanaraman et al.

(10) Patent No.: US 8,904,224 B2
(45) Date of Patent: Dec. 2, 2014

(54) PROVIDING REPLICATION AND FAIL-OVER AS A NETWORK SERVICE IN DATA CENTERS

(75) Inventors: Shivkumar Kalyanaraman, Bangalore (IN); Kalapriya Kannan, Bangalore (IN); Ravi Kothari, Bangalore (IN); Vijay Mann, Bangalore (IN); Anilkumar Vishnoi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/553,993

(22) Filed: Jul. 20, 2012

(65) Prior Publication Data

US 2014/0025986 A1    Jan. 23, 2014

(51) Int. Cl.
 *G06F 11/07* (2006.01)
(52) U.S. Cl.
 USPC .......................................... 714/4.11; 714/6.3
(58) Field of Classification Search
 CPC . G06F 11/20; G06F 11/2002; G06F 11/2023; G06F 11/2038
 USPC ................................................. 714/4.11, 6.3
 See application file for complete search history.

(56) References Cited

U.S. PATENT DOCUMENTS

| | | | |
|---|---|---|---|
| 7,979,652 B1 | 7/2011 | Sivasubramanian | |
| 8,074,107 B2 | 12/2011 | Sivasubramanian et al. | |
| 8,108,429 B2 | 1/2012 | Sim-Tang et al. | |
| 2002/0133491 A1* | 9/2002 | Sim et al. | 707/10 |
| 2008/0181226 A1* | 7/2008 | Varier et al. | 370/390 |
| 2008/0310413 A1* | 12/2008 | Cristallo et al. | 370/390 |
| 2011/0103407 A1* | 5/2011 | Varier et al. | 370/503 |
| 2012/0030508 A1 | 2/2012 | Vivian et al. | |
| 2013/0013351 A1* | 1/2013 | Cholak et al. | 705/5 |
| 2013/0073714 A1* | 3/2013 | Wang et al. | 709/224 |

OTHER PUBLICATIONS

Papathanasiou, Knits: Switch-Based Connection Hand-Off, Abstract, 2002, pp. 1-2.

Snoeren et al., Fine-Grained Failover Using Connection Migration, downloaded Oct. 10, 2012, pp. 1-13.

Snoeren et al., An End-to-End Approach to Host Mobility, 6th ACM/IEEE International Conference on Mobile Computing and Networking (MobiCom'00), pp. 1-12.

(Continued)

*Primary Examiner* — Chae Ko
(74) *Attorney, Agent, or Firm* — Ryan, Mason & Lewis, LLP (57) ABSTRACT

Techniques for providing session level replication and fail-over as a network service include generating a replication rule that replicates network traffic destined for a primary server from an originating server to a network controller and installing said rule in a switch component, identifying flows from the originating server to the primary server, replicating each incoming data packet intended for the primary server to the network controller for replication and forwarding to replica servers, determining said primary server to be in a failed state based on a number of retransmissions of a packet, to selecting one of the replica servers as a fail-over target, and performing a connection level fail-over by installing a redirection flow in the switch component that redirects all packets destined to the primary server to the network controller, which forwards the packets to the replica server and forwards each response from the replica server to said originating server.

20 Claims, 4 Drawing Sheets

(56) References Cited

OTHER PUBLICATIONS

Marwah et al., TCP Server Fault Tolerance Using Connection Migration to a Backup Server, in Proc. of IEEE Int. Conf. on Dependable System and Networks (DSN 2003), San Francisco, CA, Jun. 22-25, 2003, pp. 1-10.
Zhang et al., Efficient TCP Connection Failover in Web Server Clusters, IEEE INFOCOM 2004, pp. 1-10.
Rao et al., Using Paxos to Built a Scalable, Consistent, and Highly Available Datastore, Aug. 29-Sep. 3, 2011, Proceedings of the VLDB Endowment, vol. 4, No. 4, pp. 243-254.
Elnikety, Tashkent+: Memory-Aware Load Balancing and Update Filtering in Replicated Databases, EuroSys'07, Mar. 21-23, 2007, pp. 1-14.
Cecchet et al., Middleware-Based Database Replication: The Gaps Between Theory and Practice, SIGMOD'08, Jun. 9-12, 2008, pp. 1-14.
Marwah et al., Fault-Tolerant and Scalable TCP Splice and Web Server Architecture, 25th IEEE Symposium on Reliable Distributed Systems (SRDS'06) 2006, pp. 1-10.
Cecchet et al., C-JDBC: Flexible Database Clustering Middleware, 2004, pp. 1-10.
Zou et al. Real-Time Primary-Backup (RTPB) Replication with Temporal Consistency Guarantees, 1998, pp. 1-9.
Plattnet et al., Ganymed: Scalable Replication for Transactional Web Applications, 2004, pp. 1-20.
Patino-Martinez et al., Consistent Database Replication at the Middleware Level, ACM Transactions on Computers, vol. V. No. N, Month 2004, pp. 1-43.
Mishima et al., Pangea: An Eager Database Replication Middleware Guaranteeing Snapshot Isolation Without Modification of Database Servers, VLDB'09, Aug. 24-28, 2009, pp. 1-12.
Amza et al., Conflict-Aware Scheduling for Dynamic Content Applications, Proceedings of USITS'03: 4th USENIX Symposium on Internet Technologies and Systems, Mar. 26-28, 2003, pp. 1-15.
Tungsten-Replicator, A High Performance, Open Source, Data Replication Engine for MySQL, Apr. 30, 2011, pp. 1-2.
Recover Point, Remote Replication, Protection, EMC, Mar. 3, 2013, pp. 1-2. http://www.emc.com/replication/recoverpoint/recoverpoint.htm.
RecoverTrac DR Automation Launch, FacolStor Software, Defining Data Protection, Again, Aug. 30, 2012, pp. 1-4. http://www.falconstor.com/recovertrac.
Failover Clustering Overview, Microsoft, Feb. 29, 2012 http://technet.microsoft.com/en-us/library/hh831579(d=printer).aspx.
Oracle® Data Guard, Concepts and Administration, 10g Release 2 (10.2), Aug. 2008. http://docs.oracle.com/cd/B19306_01/server.102/b14239.pdf.
CA XOsoft™ User Guide, r12.5, 2009, Table of Contents. http://support.dell.com/support/edocs/software/pwrs_ca/Manuals/XOs_User.pdf.
InterMezzo (file system), Wikipedia, Jun. 19, 2008, pp. 1-3. http://en.wikipedia.org/wiki/Intermezzo.
IBM, DB2 Everyplace, IBM Education Assistant, Sep. 14, 2007 http://publib.boulder.ibm.com/infocenter/ieduasst/imv1r0/index.jsp?topic=/com.ibm.iea.db2e/plugin_coverpage.html.
Hitachi TrueCopy, Wikipedia, Jun. 4, 2011, pp. 1-1. http://en.wikipedia.org/wiki/Hitachi TrueCopy.
Ashok et al., SQL Server Replication: Providing High Availability Using Database Mirroring, SQL Server, Aug. 2008, pp. 1-24.
VMware vCenter Site Recovery Manager, Data Disaster Recovery for Servers, http://www.vmware.com/products/site-recovery-manager/overview.html, pp. 1-4, Jul. 5, 2012.
FlashCopy, http://publib.boulder.ibm.com/infocenter/dsichelp/ds8000ic/index.jsp?topic=%2Fcom.ibm.storage.ssic.help.doc%2Ff2c_flashcpover_1m76z6.html, pp. 1-2, 2004.
IBM System Storage SAN Volume Controller, Overview, http://www-03.ibm.com/systems/storage/software/virtualization/svc/index.html, pp. 1-8, Oct. 21, 2012.
Riverbed®, http://www.riverbed.com/us/, pp. 1-2, Aug. 26, 2012.

\* cited by examiner

PROVIDING REPLICATION AND FAIL-OVER AS A NETWORK SERVICE IN DATA CENTERS

FIELD OF THE INVENTION

Embodiments of the invention generally relate to information technology, and, more particularly, to service or connection level traffic replication.

BACKGROUND

Disaster recovery (DR) refers to processes, policies and procedures related to preparing for recovery and continuation of technology infrastructure critical to an organization after a natural or human-induced disaster.

Data synchronization is an automated action intended to make replicated data consistent with each other and up-to-date. Existing data synchronization techniques are primarily host-based or appliance-based. Data synchronization finds significance in applications such as high-availability clusters, disaster recovery and mobile computing usage. By way of example, consider a situation where a user must manually copy files from one machine to another machine, which typically includes copying entire files or directories rather than just the most recent changes.

Accordingly, goals of data synchronization techniques include keeping data updated in multiple replicas so that time required to restore a setup after a disaster or failure is minimized. Typically, data replication is achieved through storage level replication in which disk (or storage medium) contents are kept identical through incremental synchronization. There are, however, issues with storage level replication, such as, for example:

Storage level replication is typically done at a coarse time granularity and not attempted in real-time because it tends to be costly in terms of computing resources; and Storage level replication cannot help in replication of service instances because it only replicates storage contents but not memory contents (service state). Service replication requires both disk and memory contents to be replicated.

Network based replication, on the other hand, replicates inbound network traffic destined to a server. In modern data centers, almost all modifications to disk contents (or the generation of new content on the disk) of a server take place through input network traffic in the form of telnet or ssh sessions, or connections to specific applications running on the server. Therefore, replicating inbound network traffic to a server should ensure both disk replication as well as memory (state) replication. These two, in turn, can help in realizing service level replication.

The goals of connection level network traffic replication may not be limited to keeping multiple replicas in sync for disaster recovery or high availability. This may also be useful for other scenarios in enterprise data centers. A typical data center scenario can include multiple replicas in different environments, which may provide a challenge in keeping all of the replicas in sync at all times. For instance, there can be multiple instances of the same multi-tier application: one in a production environment, another one in a test environment or staging environment, and yet another one at the DR site. A test environment may make use of synthetic workloads to drive the load, but those do not appropriately represent production workload. As a result, most production performance problems cannot be recreated in the test environment. Replication of one or more network flows arriving at the production environment to the test environment can help drive the application load with production workload. This, in turn, can help capture the production request mix and recreate production problems in the test environment.

Existing approaches to network traffic replication using port mirroring or switched port analyzer (SPAN) cannot be used because they require the intended destination of replicated packets to be directly connected to the network switch at which replication takes place, as the replicated packets cannot be routed using regular routing protocols (because they have duplicate layer-2 and layer-3 addresses). In any enterprise data center, a test environment will typically never be connected to the same switch as the production environment. Furthermore, traditional port mirroring does not provide flow level granularity or connection management to maintain state. Traditional port mirroring replicates all incoming or outgoing packets at a particular port.

On the other hand, service or session fail-over is typically handled in an application-specific manner which detects the failure of a primary instance and redirects new connections to the failed-over instance. However, existing connections get dropped and are not maintained, and this can lead to loss of state and/or down-time.

SUMMARY

In one aspect of the present invention, techniques for providing connection or session level replication and fail-over as a network service in data centers are provided. An exemplary computer-implemented method for providing session level replication and fail-over as a network service can include steps of generating at least one replication rule that replicates network traffic destined for a primary server from an originating server to a network controller and installing said rule in a switch component, identifying one or more flows from the originating server to the primary server, replicating each incoming data packet intended to be routed to the primary server to the network controller for replication and forwarding to one or more replica servers after applying any required packet header modifications, determining said primary server to be in a failed state based on a specified number of retransmissions of a packet, selecting one of the one or more replica servers as a fail-over target, and performing a connection level fail-over by installing a redirection flow in the switch component that redirects all packets destined to the primary server to the network controller, which in turn, forwards the packets to the selected replica server after any required packet header modifications and forwards each response from the replica server to said originating server.

In another aspect of the invention, an exemplary computer-implemented method for responding to a failed state status of a primary server or replica server can include steps of determining a primary server and/or replica server to be in a failed state, selecting a replica server and installing a redirection flow in a switch component in the network that redirects all packets destined to the failed server to a network controller, which in turn, forwards said packets to the selected replica server and forwards responses from said replica server to the originating server in the network when the server in a failed state is a primary server, and selecting an alternate replica server and/or the primary server again, when the server in a failed state is a replica server.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention providing replication and fail over as a network service in data centers. At least one embodiment of the invention includes replicating network traffic to achieve end host data and state synchronization. Additionally network traffic replication can be used for other use cases such as replication of production workload to a set of test systems, replication of system patching commands to a set of servers, etc. Such uses cases cannot be achieved through disk based data replication. Furthermore, such network-based traffic replication not only synchronizes data on hosts but also synchronizes application states.

Similarly, for fail-over, at least one embodiment of the invention includes using a network based approach that allows seamless fail-over of existing network connections based on connection oriented protocols such as transmission control protocol (TCP). This ensures sub-second fail-over with zero packet and request loss, which cannot be achieved using disk based fail-over techniques.

Accordingly, as described herein, aspects of the invention include synchronizing data on multiple replicas through a network controller or fabric that is transparent to the end points, enabling switching over to a replica (with updated data) with zero loss by way of a recovery mechanism.

Replication of network packets not only facilitates maintaining data synchronization (at the disk level), but also maintains application states in sync which enables instantaneous fail-over to an application on a backup server. Replication at the network packet level can enable use cases such as workload replication between production and test replicas and patch replication to several server replicas in an application agnostic manner. Further, at least one embodiment of the invention includes packet/connection level fail-over with support for zero loss of in-flight transactions (connections). Also, failure of a service (or an application) as well as that of a node (end host) can be detected.

Accordingly, at least one embodiment of the invention includes providing a complete solution in the network that is transparent to end hosts. Such a solution requires no modifications to end hosts, and can allow segments of network packets/flows to be captured and played-back to several replicas not only in real-time but at also at a later point in time. Further, at least one embodiment of the invention includes utilizing path optimization algorithms for reduced overhead on the network and leverage other network intelligence (fail-over to fastest replica, etc.).

Figure 1:
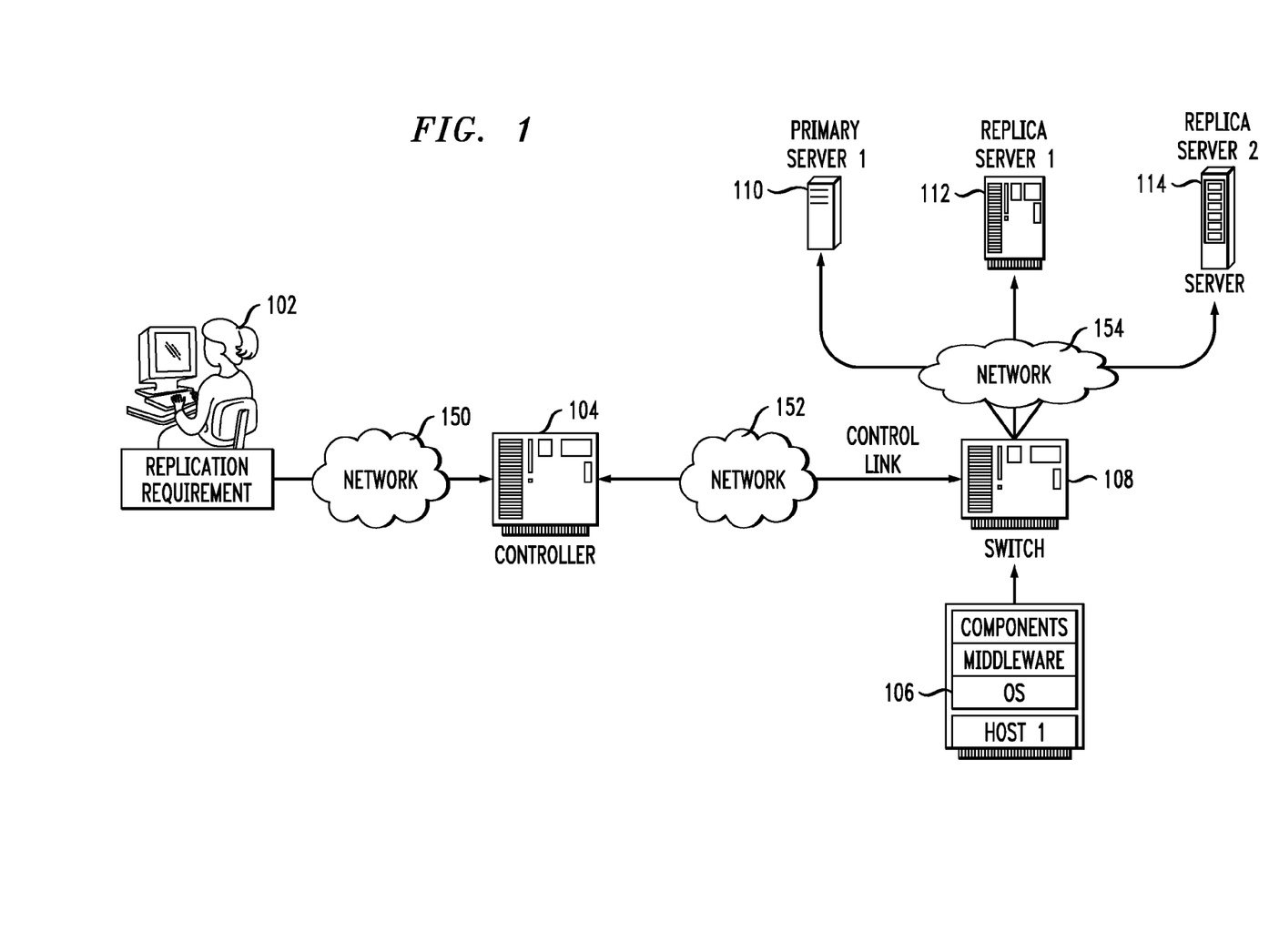
FIG. 1 is a diagram illustrating operational architecture, according to an embodiment of the invention.

FIG. 1 is a diagram illustrating operational architecture, according to an embodiment of the invention. By way of illustration, FIG. 1 depicts an administrator 102, a network 150, a controller component 104, an originating server (the "sender" or the "client") 106, a switch component 108, primary server 110, replica servers 112 and 114, and networks 152 and 154. As illustrated in FIG. 1, the administrator 102 provides input to the controller 104 via network 150. Specifically, the originating server 106, primary server 110 and the replica servers 112 and 114 addresses and ports are taken as input from the administrator 102.

The controller 104 sets-up rules in the egress switch 108 for appropriately handling network traffic generated by sender 106 as follows. For all incoming packets destined to be sent to the primary server 110, the rules in the egress switch 108 can act on the packets in one of the following ways:

In the "normal mode," the rules replicate the packets in such a way that one copy of the packet is sent to the controller 104, while the original packet is forwarded in the usual manner to the primary server 110; and In the "proxy mode," the rules redirect all packets in such a way that the original packets from the sender 106 get redirected to the controller 104.

In both the modes, the rules can optionally replace the original destination addresses in the replicated packet header with the controller's address if the switch supports header modifications. If the switch does not support header modifications, the packets are routed to the controller 104 using specialized routing rules if the controller is not directly connected to the egress switch 108. The controller can chose to either create new connections to replica servers 112 and 114 (and to primary server 110 in the case of "proxy mode") and send the payload (that is, the data portion of the packet minus the headers) of the packets captured or send raw packets that are captured after modifying the destination and source layer 3 (internet protocol (IP)) and layer 2 (Ethernet) addresses appropriately in the packet header. Creation of new connections to replica servers (and to primary server in the case of "proxy mode") is preferred because it ensures that packet losses and retransmissions will be handled by the underlying transport layer. The destination addresses (layer 3 (IP) and layer 2 (Ethernet)) in the packets are replaced with the replica server (112 and 114) addresses before sending a copy of the packets to each replica server (112 and 114). In the "proxy mode," one copy of the packet is sent by the controller to the primary server 110 in addition to all the replica servers (112 and 114), and that packet's destination addresses (layer 3 (IP) and layer 2 (Ethernet)) are replaced with the primary server's addresses.

Figure 2:
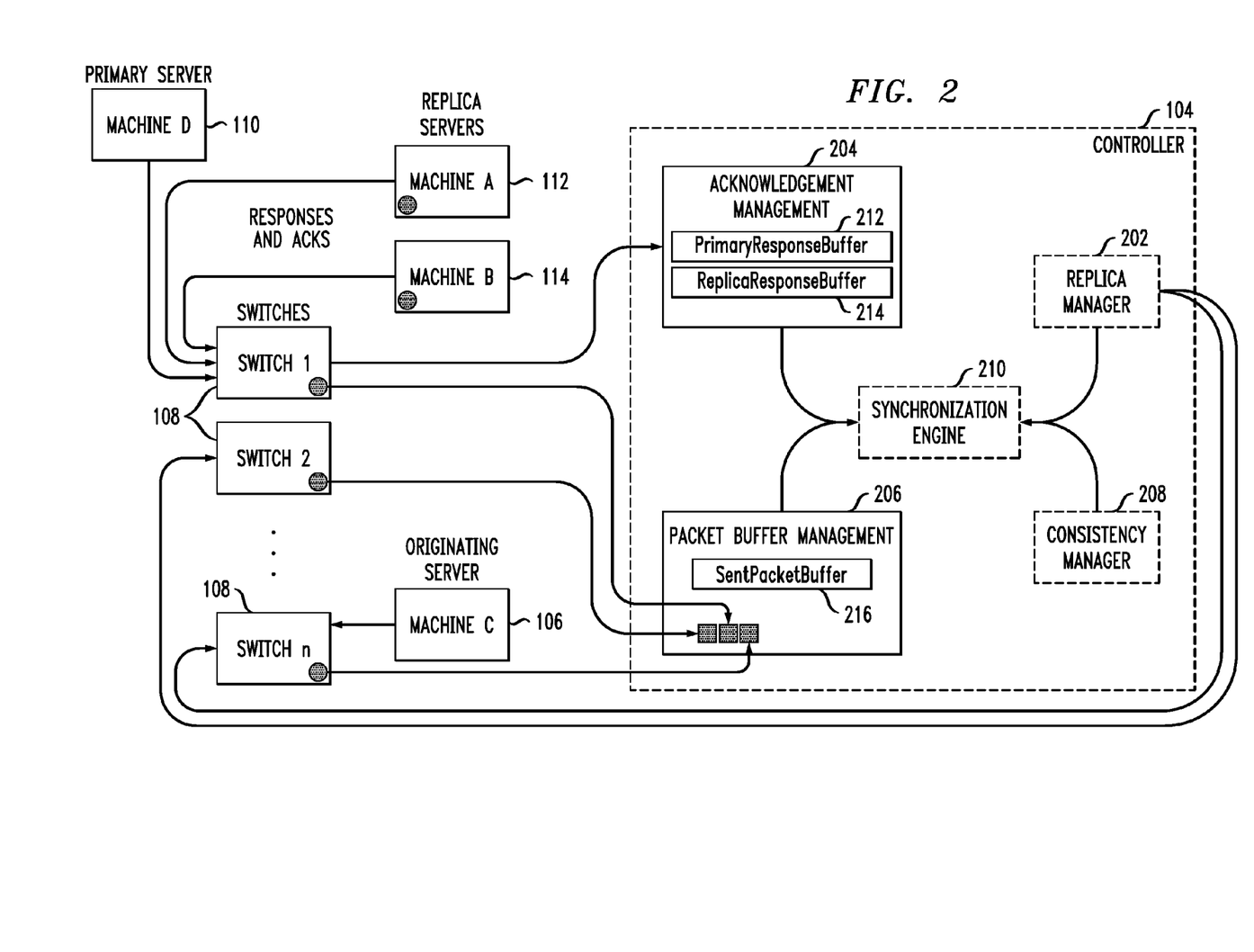
FIG. 2 is a diagram illustrating a data synchronization approach, according to an embodiment of the present invention.

FIG. 2 is a diagram illustrating a data synchronization approach, according to an embodiment of the present invention. By way of illustration, FIG. 2 depicts a controller 104 (as illustrated in FIG. 1) that includes a replica manager module 202, an acknowledgement management module 204, a packet buffer management module 206, a consistency manager module 208 and a synchronization engine 210. FIG. 2 also depicts switch components 108 as well as replica servers 112 and 114 (as also illustrated in FIG. 1).

Accordingly, replication manager module 202 facilitates setting-up rules for replica servers 112 and 114 on the switches 108. The switches 108 replicate or redirect all incoming packets destined for primary server 110 to controller 104, which in turn forwards them to all replica servers (such as machine 112 and machine 114) after appropriate header modifications if required. Additionally, the controller 104 drops all responses from the replica servers except for the response from the primary server (in the "proxy mode"). Packets received by the controller 104 are managed by the packet buffer management module 206.

Acknowledgement management module 204 of controller 104 contains buffers 212 and 214 for maintaining responses from the primary server 110 and the replica servers (112 and 114). The responses (specifically 'acks' of TCP) from the replica servers 112 and 114 and primary server 110 are sent to the switches 108. The switches 108 forward the responses/acks to the acknowledgement management module 204 of the controller 104.

As noted, acknowledgment module 204 maintains a buffer of the response packets received from the primary server 110 (the "PrimaryResponseBuffer" 212) and another buffer for response packets received from the replica servers (112 and 114) (the "ReplicaResponseBuffer" 214). Acknowledgement module 204 works in conjunction with Consistency Manager 208 and matches responses packets from primary server 110 with response packets from replica servers to ensure that packets from the originating server 106 are sent to replica servers 112 and 114 in the correct sequence or order. These response packets from primary server 110 are removed from the buffer by the Synchronization Manager 210 once the originating server 106 acknowledges these responses in subsequent packets.

Responses from replica (in the "ReplicaResponseBuffer" 214) are removed by the Synchronization Manager 210 when the corresponding response from the primary server 110 is received (these are matched based on the offset from the initial sequence numbers used by primary server 110 and the selected replica server 112).

In the "proxy mode," controller 104 also sends back the response from the primary server 110 to the originating server (the sender) 106. The controller 104 has the option to delay sending the response from primary server 110 back to originating server (the sender) 106 until it has received appropriate responses from all of the replica servers (112 and 114). This effectively achieves synchronous replication because a packet is sent to the primary server 110 only after all previous packets from the originating server have been received by all replica servers (112 and 114) and their responses have been recorded. Note that the controller 104 can be operated above the transport layer in "proxy mode" like a regular server. In this mode, the controller 104 accepts connections from the originating server 106 and replays packet payloads to primary server 110 and replicas (112 and 114).

The controller 104 also maintains a buffer of packets ("SentPacketBuffer" 216) that it receives from the originating server 106 even after those packets have been sent to replica servers 112 and 114 (and to primary server 110 in case of "proxy mode"). Packets from this buffer are removed by the Synchronization Engine 210 once they are acknowledged by the primary server 110 through its subsequent responses. SentPacketBuffer 216 is required for connection level fail-over in case the primary server 110 fails. Once a packet is received by the controller 104, Synchronization Engine 210 scans the SentPacketBuffer 216 to find out if a packet with the same sequence number already exists. If a packet with the same sequence number already exists, it indicates a packet that has been retransmitted by the originating server 106. If the number of retransmissions for a particular packet cross a threshold value (for example, 2), the primary server 110 is presumed to have failed. Note that the threshold value should be less than the maximum retransmission value (which is typically three or more on most operating systems) after which an existing connection is closed by an operating system network stack. Primary server's failure is assumed to be the underlying cause of these retransmissions (this assumption should hold true in a data center environment). SentPacketBuffer 216 can store the sequence number of sent packets instead of the full packets in order to save space. Once the primary server 110 is marked as "failed," the connection level fail-over mechanism is initiated.

Another embodiment of the invention may include a controller and a middle-box, wherein the controller is responsible only for setting-up rules on the egress switch 108 and includes only the ReplicaManager module 202, while remaining modules that perform packet capture as well as connection maintenance are handled by a middle-box software.

As noted, at least one embodiment of the invention includes a fail-over approach. As further detailed herein, in the case of a primary server being down, such approaches aim to identify this as early as possible so that the recovery process can be carried out. Also, once the primary server is down, further requests will be transmitted to the secondary replica. Additionally, if the primary server goes down after receiving a request but before generating a response, at least one embodiment of the invention includes ensuring that the response for that request is sent back to the client from the secondary replica or from the controller itself.

Within the context of disaster recovery, a fail-over technique to a safe mode can include the following actions when the controller observes that a machine is down. When a primary server is in a failed state, the response to the host can be obtained from a replicated server. The controller selects a replica (for example, the nearest replica) and installs a flow rule in the switches. Such a flow rule includes redirecting all packets destined for a primary server to be redirected to the controller 104.

For in-flight packets, at least one embodiment of the invention includes waiting for a response of those packets. As detailed herein, if the primary server 110 fails after receiving a packet but before the response (with an acknowledgement for the previously received packet) is sent out, the controller will use a response packet from the failed-over replica to respond to the host. For subsequent requests, a replica machine will act as a primary server.

Figure 3:
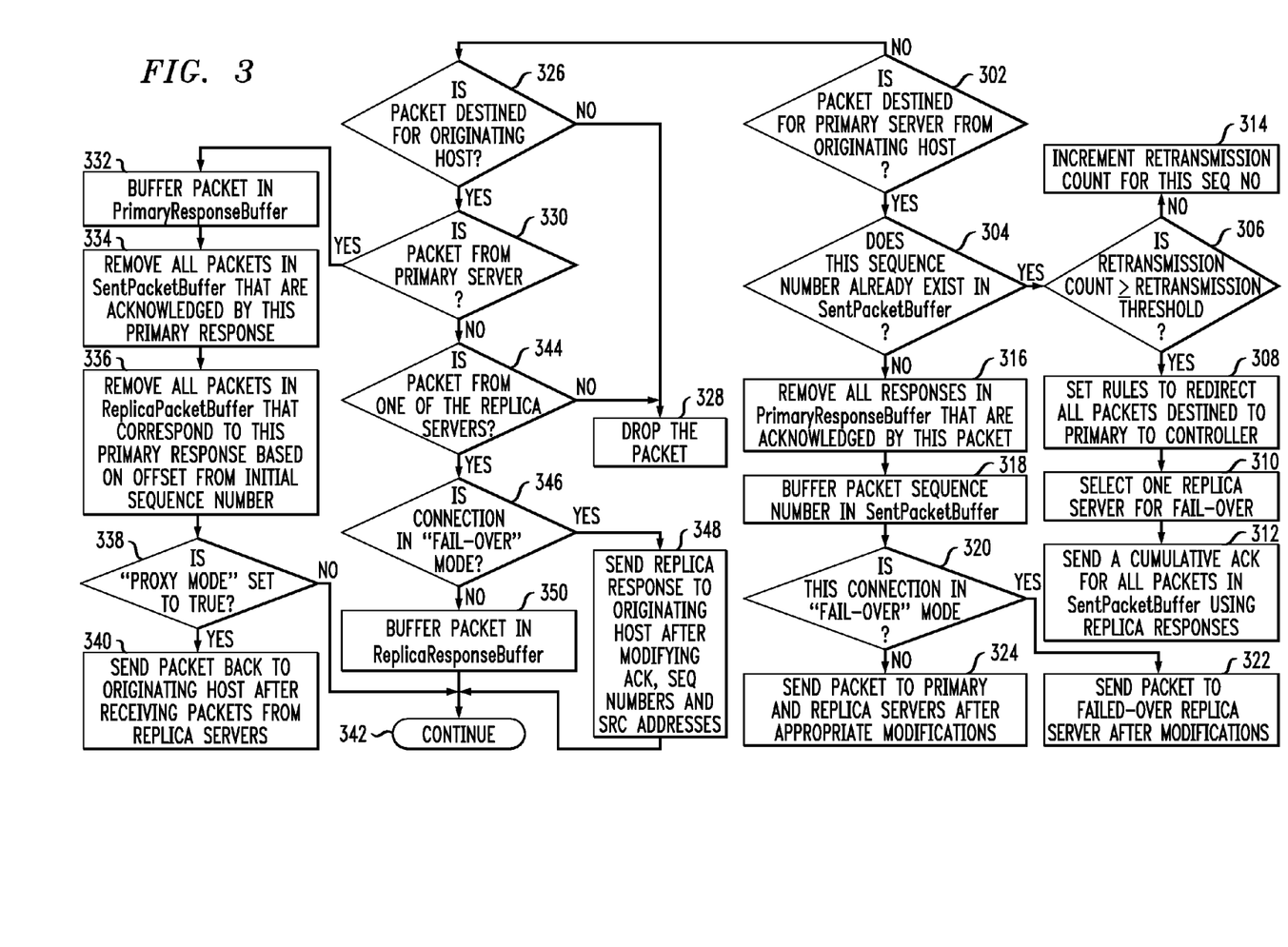
FIG. 3 is a flow diagram illustrating a fail-over approach, according to an embodiment of the present invention.

FIG. 3 is a flow diagram illustrating a fail-over approach, according to an embodiment of the present invention. Specifically, FIG. 3 illustrates the overall steps taken at the controller when it receives a packet. Step 302 includes determining if a packet is destined for a primary server. If yes, step 304 includes checking if a packet with the same sequence number already exists in controller's SentPacketBuffer. If yes, it indicates a packet that has been retransmitted by the originating server and in step 306, the controller checks if the number of retransmissions for a particular packet has crossed a threshold value (for example, two). If yes, the primary server is presumed to have failed and a connection level fail-over mechanism is initiated (steps 308-312). If the result of step 306 is a no, the controller increments the retransmission count for the given sequence number in step 314.

Accordingly, with an example fail-over approach, the primary server is inactive. The controller, by way of tracking the packets and acknowledgements for packets, can accomplish the following actions to complete a connection-level fail-over:

The rule in the egress switch 108 is modified by Replica-Manager 202 to ensure that all packets destined for primary server 110 are redirected (instead of being replicated) to controller in step 308. In the "proxy mode," this step is not required because all packets are already redirected to controller.

All packets in the SentPacketBuffer 216 at the controller 104 indicate packets that were sent to primary server 110, but the primary server 110 failed before acknowledging them. If there are no responses from the replica servers (112 and 114), controller 104 either sends individual acknowledgement packets (ACKs) or a cumulative acknowledgement packet for all the packets in the SentPacketBuffer 216 (step 312). The sequence and acknowledgement (ACK) numbers for this ACK packet should correspond to the ones expected by the originating server 106 as follows:

Sequence_number_for controller ack=acknowledgement number in the last sent packet; and Acknowledgement_number_for controller ack=Sequence number of last sent packet+last sent packet len+1.

Also in step 312 and 348, if there are responses from the replicas (112; only one replica is selected as the fail-over destination in step 310) that need to be sent to the originating server 106 (because the primary server 110 failed before generating these responses), these responses are sent along with the acknowledgement. The sequence number of these packets corresponds to the acknowledgement number expected by the originating server 106 as follows:

Sequence_number_for_replica_response=initial primary server sequence number+(current replica sequence number−initial replica sequence number).

In other words, this is equal to the sum of initial sequence number used by the primary server 110 and the offset of the current replica 112 response sequence number from the first replica 112 response sequence number. The acknowledgement number of these packets corresponds to the next sequence number expected from the originating server 106 as follows:

Acknowledgement number for replica (112) response=initial primary server 110 ack number+(current replica server 112 ack number−initial replica server 112 ack number).

The acknowledgement number (ACK) in all subsequent sender packets is also changed appropriately (in step 324) before sending them to the failed-over replica (112) as follows:

Acknowledgement number for sender 106 packets (after fail-over)=initial replica server (112) ack number+(current sender 106 ack number−initial sender 106 ack number).

If the result of step 304 is a no, it indicates a normal transmission (and not a retransmission) and the acknowledgement number in the packet is used to delete corresponding packets from PrimaryResponseBuffer in step 316. The packet sequence number is buffered in SentPacketBuffer in step 318. If the connection is in fail-over mode (step 320), the packet is sent to the selected failed-over replica in step 322 after appropriate modifications (source addresses are replaced with those of replica, and the sequence number and acknowledgement numbers are replaced with those from the primary server). If the connection is in normal mode, the packet is sent the primary server as well as all replica servers in step 324 after appropriate modifications.

If the result of step 302 is no, the sequence proceeds to step 326, which includes determining if the packet is for the originating server. If the packet is not for the originating server, step 328 includes dropping the packet. If the packet is for the originating server, the sequence proceeds to step 330, which includes determining if the packet is from the primary server. If yes, the packet is buffered in the PrimaryResponseBuffer in step 332 and the acknowledgement number in the packet is used to remove all sequence numbers in SentPacketBuffer that have been acknowledged in step 334. Responses from replica (in the "ReplicaResponseBuffer" 214) are removed in step 336 after matching the response from the primary server with the replica responses based on the offset from the initial sequence numbers used by primary server and those used by the replica servers.

Step 338 includes finding if the "proxy mode" is set to true. If yes, the controller sends the primary response packet back to originating server in step 340 after receiving responses from all replica servers. If no, the controller continues its execution in step 342.

If the result of step 330 is no, the controller determines if the packet is for the originating server from one of the replica servers in step 344. If the result is no, the packet is dropped in step 328. If yes, step 346 includes determining if the connection is in fail-over mode. If yes, the packet from a selected replica server is sent to the originating server after appropriate modifications (source addresses, sequences number and acknowledgement numbers are replaced with those of primary server). If the result of step 346 is no, the packet is buffered in ReplicaResponseBuffer in step 350 and the controller continues its execution (step 342).

Figure 4:
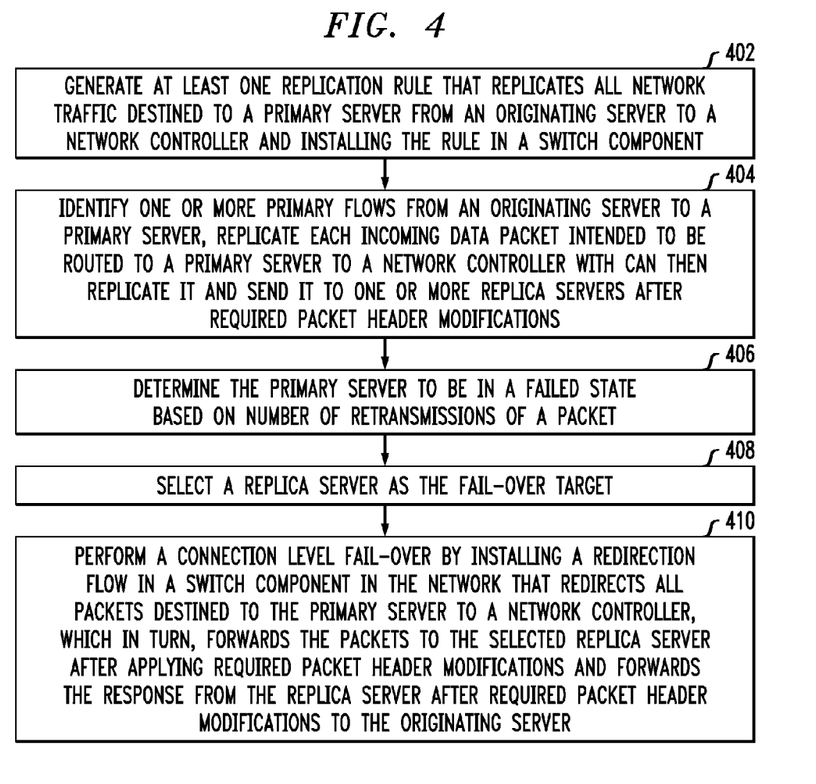
FIG. 4 is a flow diagram illustrating techniques for providing session replication and fail-over as a network service, according to an embodiment of the invention.

FIG. 4 is a flow diagram illustrating techniques for providing session replication and fail-over as a network service, according to an embodiment of the invention. Step 402 includes generating at least one replication rule that replicates all network traffic destined to a primary server from an originating server to a network controller and installing the rule in a network switch component. The generating step can include, for each incoming data packet intended to be routed to a primary server from an originating server, creating a copy of the data packet and modifying the destination address of the newly created packet to a network controller and outputting to a port that leads to the network controller. This rule can be generated in a "proxy mode," wherein each incoming data packet intended to be routed to a primary server from an originating server at a network switch is redirected to a network controller.

Step 404 includes identifying one or more primary flows from an originating server to a primary server, and replicating each incoming data packet intended to be routed to a primary server to a network controller which can then replicate the packet and send it to one or more replica servers after required packet header modifications. The network controller can chose to either create new connections to one or more replica servers and to a primary server in case of "proxy mode," and send the payload of the packets captured or send raw captured packets to one or more replica servers and primary server (in case of "proxy mode") after required packet header modifications.

The step of modifying a packet header may include replacing the destination layer 3 (IP) and layer 2 (Ethernet) addresses in the packet header with those of replica servers, source layer 3 (IP) and layer 2 (Ethernet) addresses in the packet header with that of the network controller, and replacing the acknowledgement number in the packet header that corresponds to the sequence number used by each replica server. The controller maintains a buffer of the response packets received from the primary server and matches them with the response packets received from the replica servers to ensure that packets from the originating server are sent to replica servers in the correct sequence.

The response packets from the primary server are removed from the buffer once the originating server acknowledges these responses in subsequent packets. Response packets from the replica server are removed from the buffer when the corresponding response from the primary server is received and is matched based on the offset from the initial sequence numbers used by primary server and the replica servers. In this step, the controller can chose to operate in a "proxy mode" and accomplish synchronous replication by delaying the sending of the responses from the primary server back to the originating server until it has received the appropriate responses from all replica servers.

Step 406 includes determining a primary server to be in a failed state based on the number of retransmissions of a packet. In order to detect retransmissions, the controller maintains a buffer of packets that it receives from the originating server and checks if the sequence number of the received packet already exists in its buffer. Packets received from the originating server are removed from the buffer once they are acknowledged by the primary server through its subsequent responses.

Step 408 includes selecting a replica server as the fail-over target in the case of a primary server failure. Step 410 includes performing a connection level fail-over by installing a redirection flow in a switch component in the network that redirects all packets destined to the primary server to a network controller which, in turn, forwards the packets to the selected replica server after required packet header modifications and forwards the responses from the replica server after required packet header modifications to the originating server.

The techniques depicted in FIG. 4 can also include obtaining an originating server address and port, primary data server address and port along with replica server addresses and ports as input.

Additionally at least one embodiment of the invention includes a controller and a middle-box, wherein the controller can be responsible only for setting-up rules on the network switch, while packet capturing as well as connection maintenance are separately handled by the middle-box software.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
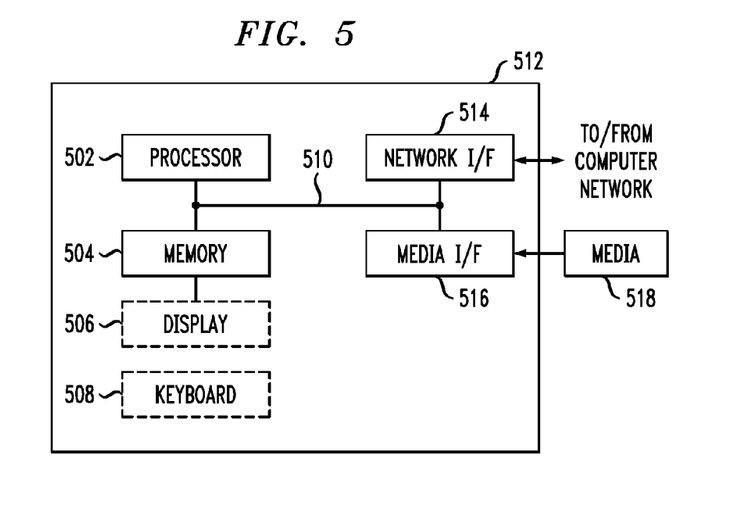
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, synchronizing data on multiple replicas through a network fabric that transparent to the end points.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing session level replication and fail-over as a network service, the method comprising:
    generating at least one replication rule that replicates network traffic destined for a primary server from an originating server to a network controller and installing said rule in a switch component;
    identifying one or more flows from the originating server to the primary server, replicating each incoming data packet intended to be routed to the primary server to the to network controller for replication and forwarding to one or more replica servers;
    determining said primary server to be in a failed state based on a specified number of retransmissions of a packet;
    selecting one of the one or more replica servers as a fail-over target; and
    performing a connection level fail-over by installing a redirection flow in the switch component that redirects all packets destined to the primary server to the network controller, which in turn, forwards the packets to the selected replica server after any required packet header modifications and forwards each response from the replica server to said originating server.

2. The method of claim 1, comprising obtaining an originating server address and port, a primary data server address and port, and replica server addresses and ports as input.

3. The method of claim 1, wherein said generating comprises, for each incoming data packet intended to be routed to the primary server from the originating server, creating a copy of the data packet and modifying the destination address of the copy to the network controller and outputting to a port that leads to the network controller.

4. The method of claim 1, wherein said rule can be generated in a proxy mode wherein each incoming data packet intended to be routed to the primary server from the originating server at the switch component is redirected to the network controller that, in turn, replicates the received packet and sends the packet to the primary server and one or more replica servers to achieve synchronous replication.

5. The method of claim 1, wherein the network controller can chose to (i) create new connections to one or more replica servers and the primary server in case of to proxy mode, and send a payload of the packets captured and/or (ii) send raw captured packets to one or more replica servers and the primary server after applying required packet header modifications.

6. The method of claim 1, comprising applying packet header modifications to a data packet that is intended to be routed to the primary server from the originating server.

7. The method of claim 6, wherein applying packet header modifications to a data packet includes replacing destination layer 3 and layer 2 addresses in the packet header with those of replica servers, source layer 3 and layer 2 addresses in the packet header with those of the network controller, and inserting an acknowledgement number in the packet header that corresponds to the sequence number used by each replica server.

8. The method of claim 1, wherein the controller maintains a buffer of response packets received from the primary server and matches the response packets with response packets received from the replica servers to ensure that packets from the originating server are sent to replica servers in the correct sequence.

9. The method of claim 8, wherein the response packets from the primary server are removed from the buffer once the originating server acknowledges said responses in subsequent packets.

10. The method of claim 8, wherein the response packets from a replica server are removed from the buffer when a corresponding response from the primary server is received and is matched based on an offset from initial sequence numbers used by the primary server and the replica server.

11. The method of claim 1, wherein the controller operates in a proxy mode and accomplishes synchronous replication by delaying sending of a response from the primary server back to the originating server until the controller has received appropriate responses from all replica servers.

12. The method of claim 1, wherein the controller maintains a buffer of packets received from the originating server to detect retransmission of a particular packet by the originating server by checking if the sequence number of the received packet already exists in the buffer.

13. The method of claim 12, wherein the packets received from the originating server are removed from the buffer once said packets are acknowledged by the primary server through its subsequent responses.

14. The method of claim 1, wherein the controller marks the primary server as failed if the number of retransmissions for a particular packet from the originating server crosses a threshold value and a connection level fail-over mechanism is initiated.

15. The method of claim 1, wherein the controller selects a replica server as the fail-over target and installs a redirection flow in the switch component that redirects all packets destined to the primary server to the network controller, which in turn, forwards said packets to the selected replica server after applying required packet header modifications and forwards all responses from said replica server after applying appropriate packet header modifications to the originating server.

16. The method of claim 15, wherein the packets forwarded to the replica server are modified such that the packet header includes a correct destination corresponding to the replica's address and source corresponding to the originating server's address, layer 3 address and layer 2 address.

17. The method of claim 15, wherein the response packets from the replica server are modified such that the response packet header includes a correct sequence number and acknowledgement number corresponding to the sequence and acknowledgement numbers that would have been used by the primary server to respond.

18. An article of manufacture comprising a computer readable storage medium having computer readable instructions tangibly embodied thereon which, when implemented, cause a computer to carry out a plurality of method steps comprising:
    generating at least one replication rule that replicates network traffic destined for a primary server from an originating server to a network controller and installing said rule in a switch component;
    identifying one or more flows from the originating server to the primary server, replicating each incoming data packet intended to be routed to the primary server to the network controller for replication and forwarding to one or more replica servers;
    determining said primary server to be in a failed state based on a specified number of retransmissions of a packet;
    selecting one of the one or more replica servers as a fail-over target; and
    performing a connection level fail-over by installing a redirection flow in the switch component that redirects all packets destined to the primary server to the network controller, which in turn, forwards the packets to the selected replica server after any required packet header modifications and forwards each response from the replica server to said originating server.

19. A system for providing session level replication and fail-over as a network service, comprising:
    at least one distinct software module, each distinct software module being embodied on a tangible computer-readable medium;
    a memory; and
    at least one processor coupled to the memory and operative for:
        generating at least one replication rule that replicates network traffic destined for a primary server from an originating server to a network controller and installing said rule in a switch component;
        identifying one or more flows from the originating server to the primary server, replicating each incoming data packet intended to be routed to the primary server to the network controller for replication and forwarding to one or more replica servers;
        determining said primary server to be in a failed state based on a specified number of retransmissions of a packet;
        selecting one of the one or more replica servers as a fail-over target; and
        performing a connection level fail-over by installing a redirection flow in the switch component that redirects all packets destined to the primary server to the network controller, which in turn, forwards the packets to the selected replica server after any required packet header modifications and forwards each response from the replica server to said originating server.

20. A method for responding to a failed state status of a primary server and/or replica server, the method comprising:
    determining a primary server and/or replica server to be in a failed state;
    selecting a replica server and installing a redirection flow in a switch component in the network that redirects all packets destined to the failed server to a network controller, which in turn, forwards said packets to the selected replica server and forwards responses from said replica server to the originating server in the network when the server in a failed state is a primary server; and
    selecting an alternate replica server and/or the primary server again, when the server in a failed state is a replica server.

* * * * *